Patented Jan. 11, 1927.

1,613,919

UNITED STATES PATENT OFFICE.

HERMANN WAGNER, WERNER LANGBEIN, AND KARL BECK, OF HOCHST-ON-THE-MAIN, AND KARL THIESS, OF SINDLINGEN, NEAR HOCHST-ON-THE-MAIN, GERMANY, ASSIGNORS, BY MESNE ASSIGNMENTS, TO GRASSELLI DYESTUFF CORPORATION, OF NEW YORK, N. Y., A CORPORATION OF DELAWARE.

AZO DYESTUFFS AND PROCESS OF MAKING SAME.

No Drawing. Application filed January 29, 1925, Serial No. 5,621, and in Germany February 8, 1924.

We have found that valuable azo-dyestuffs, varying in color from red to violet to black of excellent fastness to light and a good fastness to kier-boiling, are obtained by causing the diazo-compounds of aromatic amines to act upon products resulting from the condensation of mono- or diamino-carbazols or their homologues and substitution products with one or two molecular proportions of $\beta$-hydroxynaphthoic acid and its substitution products in which the ortho position to the hydroxyl group is unoccupied. The azo-dyestuffs thus obtained can be produced both in substance or on a substratum, for instance for manufacturing color lakes, and also on the fibre in the manner in which the so-called ice-colors are produced.

The preparation of the carbazylamides of the $\beta$-hydroxynaphthoic acid is carried out by the same method as that used for the preparation of the known $\beta$-hydroxynaphthoic acid arylides.

The following examples illustrate our invention:

1. 13,8 parts of p-nitraniline are diazotized with 36 parts of hydrochloric acid of 20° Bé., and 7 parts of nitrite and the mass is run, while cooling, into a solution of 35,2 parts of the condensation product from 18,8 parts of $\beta$-hydroxynaphthoic acid and 18.2 parts of amino-carbazol of the following formula:

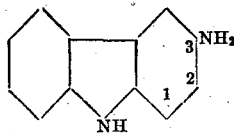

in 14 parts of caustic soda and 3000 parts of water. The separation of the red dyestuff sets in at once. The product is then stirred for some time and the resulting product filtered and dried.

2. 18,4 parts of benzidine are diazotized with 60 parts of hydrochloric acid of 20° Bé. and 14 parts of nitrite and the resulting diazo compound is run, while cooling, into a solution of 92 parts of the condensation product from 37,6 parts of $\beta$-hydroxynaphthoic acid and 57,8 parts of 3-amino-6-Br. N-ethylcarbazol in 24 parts of caustic soda and 8000 parts of water. Separation of the violet dyestuff sets in at once. The resulting product is stirred for some time and then filtered and dried.

3. Grounding: condensation product from 1 molecule of $\beta$-hydroxynaphthoic acid with 1 molecule of 3-aminocarbazol.

13,5 grams of this product are dissolved in 40 ccm. of caustic soda solution of 34° Bé. and 30 ccm. of sodium Turkey-red oil of 50 per cent strength and the solution is made up with hot water to 1 litre.

Dyeing in a solution of:
2,62 grams of 1-amino-benzene-4 (1'-azo-4'-aminonaphthalene), 5,20 ccm. of hydrochloric acid of 22° Bé., 1,44 grams of nitrite filled up to 1 litre with hot water and neutralized with 4 grams of sodium acetate.

4. Grounding: condensation product from 2 molecules of $\beta$-hydroxynaphthoic acid with 1 molecule of 3.6-diaminocarbazol.

10,2 grams of this product are dissolved in 30 ccm. of caustic soda lye of 34° Bé. and 30 ccm. of sodium Turkey-red oil of 50 per cent strength and the solution is made up with hot water to 1 litre.

Dyeing in a solution of:
2,62 grams of 1-amino-benzene-4 (1'-azo-4'-aminonaphthalene), 5,2 ccm. of hydrochloric acid of 22° Bé., 1,44 grams of nitrite filled up with hot water to 1 litre and neutralized with 4 grams of sodium acetate.

5. Grounding: condensation product from 1 molecule of $\beta$-hydroxynaphthoic acid with 1 molecule of 3-aminocarbazol.

7 grams of this product are dissolved in 20 ccm. of caustic soda solution of 34° Bé., 15 grams of sodium Turkey-red oil of 50 per cent strength and the solution is made up with hot water to ½ litre.

Dyeing in the following diazo solution:
2,91 grams of 1-ethoxybenzene-2 (1'-azo-4'-aminonaphthalene) 2,6 ccm. of hydrochloric acid of 22° Bé., 0,72 grams of nitrite filled up with hot water to 1 litre and neutralized with 2 grams of sodium acetate.

6. Grounding: same as specified in Example 5, the dyeing being performed in a diazo solution of:
2,75 grams of 1-benzaldehyde-3 (1'-azo-4'-aminonaphthalene), 2,60 ccm. of hydrochloric acid of 22° Bé., 0,72 grams of nitrite filled up with hot water to 1 litre and neutralized with 2 grams of sodium acetate.

According to Examples 3 to 6 the boiled and then dried cotton yarn is well impregnated with the napthol grounding, then wound off and dyed, without drying, in the respective diazo solution whereupon the material is washed while cold and passed through a bath of sodium carbonate heated to 50° C. (containing 2 grams of calcined sodium carbonate per litre), again washed when cold and dried.

In this way deep black shades of excellent properties as to fastness are obtained.

By the term "diazo compound" we understand throughout the specification and claims not only compounds possessing one diazo-group, but also those containing two or more of these groups, for instance tetrazo compounds.

We claim:

1. Process of producing azo-dyestuffs, consisting in combining diazo-compounds with condensation products of 2-hydroxynaphthalene-3-carboxylic acid and amino carbazols.

2. Process of producing azo-dyestuffs consisting in combining diazo-compounds with the condensation product of 2-hydroxynaphthalene-3-carboxylic acid and 3-amino-carbazol.

3. Process of producing azo-dyestuffs, consisting in combining diazo-compounds with the condensation product of one molecule of 2-hydroxynaphthalene-3-carboxylic acid and one molecule of 3-amino-carbazol.

4. Process of producing azo-dyestuffs, consisting in combining the tetrazo-compound of 1-aminobenzene-p-(1'-azo-4'-aminonaphthalene) with condensation products of 2-hydroxynaphthalene-3-carboxylic acid and amino-carbazols.

5. Process of producing azo-dyestuffs, consisting in combining the tetrazo-compound of 1-amino-benzene-p-(1'-azo-4'-aminonaphthalene) with the condensation product of 2-hydroxy-naphthalene-3-carboxylic acid and 3-amino-carbazol.

6. As new products, the coloring matters obtainable by combining diazo-compounds with condensation products of 2-hydroxy-naphthalene-3-carboxylic acid and amino-carbazols, being red to blue to black powders, insoluble in water, soluble in concentrated sulfuric acid with a red to blue color.

7. As new products, the coloring matters obtainable by combining diazo-compounds with the condensation product of 2-hydroxy-naphthalene-3-carboxylic acid and 3-amino-carbazol, being red to blue to black powders, insoluble in water, soluble in concentrated sulfuric acid with a red to blue color.

8. As new products, the coloring matters obtainable by combining diazo-compounds with the condensation product of one molecule of 2-hydroxynaphthalene-3-carboxylic acid and one molecule of 3-amino-carbazol, being red to blue to black powders, insoluble in water, soluble in concentrated sulfuric acid with a red to blue color.

9. As new products, the coloring matters obtainable by combining the tetrazo-compound of 1-aminobenzene-p-(1'-azo-4'-aminonaphthalene) with condensation products of 2-hydroxynaphthalene-3-carboxylic acid and amino-carbazols, being black powders, insoluble in water, soluble in concentrated sulfuric acid with a red to blue color, giving black tints of very good fastness when produced on the vegetable fibre.

10. As a new product, the coloring matter of the following formula:

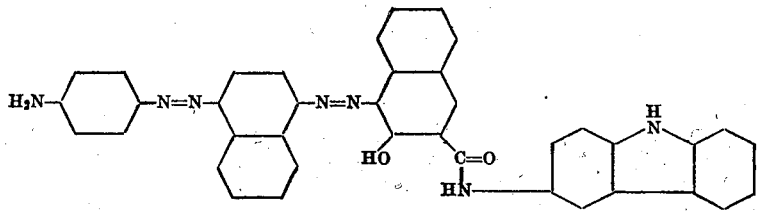

obtainable by combining the tetrazo-compound of 1-aminobenzene-p-(1'-azo-4'-aminonaphthalene) with the condensation product of 2-hydroxynaphthalene-3-carboxylic acid and 3-amino-carbazol, being a black powder, insoluble in water, soluble in concentrated sulfuric acid with a red to blue color, giving black tints of very good fastness when produced on the vegetable fibre.

11. As new products, textile materials dyed with the coloring matters defined in claim 6.

12. As new products, textile materials dyed with the coloring matters defined in claim 7.

13. As new products, textile materials dyed with the coloring matters defined in claim 8.

14. As new products, textile materials dyed with the coloring matters defined in claim 9.

15. As new products, textile materials dyed with the coloring matter defined in claim 10.

In testimony whereof, we affix our signatures.

HERMANN WAGNER.
WERNER LANGBEIN.
KARL BECK.
KARL THIESS.